(12) United States Patent
Hessbrueggen et al.

(10) Patent No.: US 8,661,950 B2
(45) Date of Patent: Mar. 4, 2014

(54) MACHINING APPARATUS AND METHOD OF LOADING AND UNLOADING SAME

(75) Inventors: Norbert Hessbrueggen, Salach (DE); Markus Hessbrueggen, Goeppingen (DE); Helmut Schuster, Denklingen (DE); Markus Schuster, Fuchstal-Leeder (DE)

(73) Assignee: Emag Holding GmbH, Salach (DE)

( * ) Notice: Subject to any disclaimer, the term of this patent is extended or adjusted under 35 U.S.C. 154(b) by 304 days.

(21) Appl. No.: 13/302,022

(22) Filed: Nov. 22, 2011

(65) Prior Publication Data

US 2012/0125165 A1   May 24, 2012

(30) Foreign Application Priority Data

Nov. 22, 2010 (DE) .......................... 10 2010 051 866

(51) Int. Cl.
*B23Q 11/08* (2006.01)

(52) U.S. Cl.
USPC .................. 82/1.11; 82/122; 82/125; 82/129; 82/901

(58) Field of Classification Search
USPC .......... 82/1.11, 122, 121, 124, 125, 129, 149, 82/901; 409/137, 134; 29/DIG. 79
See application file for complete search history.

(56) References Cited

U.S. PATENT DOCUMENTS

| 3,366,012 | A | * | 1/1968 | Richter ......................... 409/134 |
| 4,742,739 | A | * | 5/1988 | Yamaguchi et al. ............ 82/122 |
| 4,863,319 | A | * | 9/1989 | Winkler et al. ............... 409/134 |
| 5,364,210 | A | * | 11/1994 | Rutschle et al. .............. 409/134 |
| 5,439,431 | A | * | 8/1995 | Hessbruggen et al. ......... 483/14 |
| 6,021,695 | A | * | 2/2000 | Kosho et al. .................... 82/122 |
| 6,216,325 | B1 | * | 4/2001 | Haninger et al. .............. 29/33 P |
| 6,634,265 | B2 | * | 10/2003 | Yasuda et al. ................... 82/124 |
| 7,013,544 | B2 | * | 3/2006 | Yasuda et al. ................. 29/27 C |
| 7,165,919 | B2 | * | 1/2007 | Schweizer et al. ............ 409/137 |

FOREIGN PATENT DOCUMENTS

EP    1711309 B    4/2008

* cited by examiner

*Primary Examiner* — Daniel Howell
*Assistant Examiner* — Nicole N Ramos
(74) *Attorney, Agent, or Firm* — Andrew Wilford (57) ABSTRACT

A machining apparatus has a frame defining a transfer station and a machining station thereabove, a spindle having a workpiece grab and vertically displaceable on the frame between an upper position with the grab in the machining station and a lower position with the grab in the transfer station, a tool holder horizontally displaceable on the frame toward and away from the machining station, and a workpiece conveyor extending through the transfer station. After shifting a deflector underneath the machining station into a side position out from underneath the grab, the grab is lowered to pick an at least partially unmachined workpiece in the transfer station off the conveyor and then raised with the workpiece into the machining station. The deflector is then shifted between a use position over the transfer station and under the machining station and a side position allowing the spindle to pass.

11 Claims, 6 Drawing Sheets

MACHINING APPARATUS AND METHOD OF LOADING AND UNLOADING SAME

FIELD OF THE INVENTION

The present invention relates to a machining apparatus. More particularly this invention concerns a method of loading and unloading such an apparatus.

BACKGROUND OF THE INVENTION

A standard pickup-type machining apparatus has a frame on which a vertically shiftable spindle carrying a workpiece grab is rotatable. A machining station is provided in the frame below the spindle, and a transfer station below the machining station. A workpiece holder, which can be a turret holding a number of tools, is horizontally shiftable toward and away from the machining station, and a conveyor extends horizontally into and even through the transfer station.

In a typical machining cycle the conveyor transports an unmachined workpiece horizontally into the transfer station. Then the spindle drops, engages the unmachined workpiece with the grab, then raises the workpiece to the machining station, and then holds the workpiece in the machining station. The tool is brought horizontally into engagement with the workpiece, either while the workpiece is stationary to, for instance, bore a hole in it, or while it is rotating to machine or finish its outer surface. When at least one such machining operation is completed, the tool is withdrawn horizontally away from the workpiece, any rotation of the workpiece is stopped, and the spindle is lowered and the grab released to set the workpiece down on the conveyor in the transfer station, whereupon the machined workpiece is transported away and the cycle can be repeated.

In EP 1 711 309 two workpiece spindles are provided and two turrets. The machine operates by way of a pendulum mechanism so that while one spindle processes a workpiece, the other can be loaded. Four numerically controlled axes are provided and the loading takes place using two loading and unloading devices.

OBJECTS OF THE INVENTION

It is therefore an object of the present invention to provide an improved machining apparatus and method of loading and unloading same.

Another object is the provision of such an improved machining apparatus and method of loading and unloading same that overcomes the above-given disadvantages, in particular that simplifies turning machines of this type, reduces the construction effort and has a compact structure.

It is also an object of the invention to provide a loading method that reduces downtimes during which no workpiece processing takes place.

SUMMARY OF THE INVENTION

A machining apparatus has a frame defining a first transfer station and a first machining station thereabove, a first spindle having a workpiece grab and vertically displaceable on the frame between an upper position with the grab in the machining station and a lower position with the grab in the transfer station, a tool holder horizontally displaceable on the frame toward and away from the machining station, and a workpiece conveyor extending through the transfer station. After shifting a deflector underneath the machining station into a side position out from underneath the grab, the grab is lowered to pick an at least partially unmachined workpiece in the transfer station off the conveyor and then raised with the workpiece into the machining station. The deflector is then shifted into a use position over the transfer station and under the machining station, and a tool held in the tool holder is engaged with the workpiece in the machining station and machining the workpiece such that chips fall from the workpiece while maintaining the deflector in the use position and deflecting the falling chips with the deflector away from the transfer station. Then the machining of the workpiece is stopped and the deflector is shifted into the side position and the grab is lowered with the machined workpiece onto the conveyor in the transfer station. Finally, the machined workpiece is transported out of the transfer station and a fresh at least partially unmachined workpiece is moved into the transfer station.

Thus according to the invention, the loading and unloading or transfer station is located directly underneath the machining station so that the workpiece spindle can deposit and pick up a completely finished workpiece and pick up an unfinished workpiece on the conveyor by solely moving vertically. Even though the workpiece spindle can only be moved vertically, no additional loading and unloading device is needed. With this method, a two-spindle machine tool can be operated particularly advantageously, and the tool holder or turret can be moved is exclusively horizontally back and forth between the two workpiece spindles. This double-spindle machine requires only three controlled axes.

The frame according to the invention thus defines a second machining station and a second transfer station respectively level with the first machining station and the first transfer station. The method further has according to the invention the steps of shifting the tool holder alternately between the machining stations to machine workpieces therein, moving a workpiece into and out of one of the stations while machining in the other and vice versa, and alternately transporting unmachined workpieces into and out of the transfer stations. With this method the "unmachined" workpiece can actually be a workpiece that was partially machined with the other spindle.

The conveyor according to the invention passes between the transfer stations. The method further has according to the invention the step of inverting workpieces as they pass from one of the transfer stations to the other so that both ends or sides of the workpiece can be machined by the machine.

The method according to the invention includes the step of rotating the workpiece about a vertical axis while pressing the tool radially against the workpiece to machine the workpiece. Alternately the workpiece can be held still and the horizontally displaceable tool, for example a drill bit, can be rotated about a horizontal axis.

The machining apparatus according to the invention thus has a frame defining a first transfer station and a first machining station thereabove, a first spindle having a workpiece grab and only vertically displaceable on the frame between an upper position with the grab in the machining station and a lower position with the grab in the transfer station, a tool holder horizontally displaceable on the frame toward and away from the machining station, a workpiece conveyor extending through the transfer station, and a deflector underneath the machining station and shiftable between a side position out from underneath the grab and a use position extending between the stations and blocking access to the transfer station from above. A drive or actuator, with the deflector in the side position, lowers the grab, picks an at least partially unmachined workpiece in the transfer station off the conveyor with the grab, and raises the grab and workpiece into the machining station. Similarly the deflector is shifted by an actuator into a use position over the transfer station and under the machining station when the grab is in the upper position. Another drive engages a tool held in the tool holder with the workpiece in the machining station and machines the workpiece such that chips fall from the workpiece while maintaining the deflector in the use position and deflecting the falling chips with the deflector away from the transfer station.

The frame of this machine has a first side wall extending in a first side plane and carrying a vertical guide on which the spindle is vertically shiftable and a front wall extending in a front plane meeting the first side plane at a first corner of the frame and carrying a horizontal guide on which the holder is shiftable. The stations are at the first corner. The vertical guide includes a vertical guide rail at the first corner and the horizontal guide extends to the first corner. The tool holder is only shiftable horizontally.

In a two-spindle system, a second side wall extends in a second plane and meets the front plane at a second corner and the frame defines a second transfer station at the second corner and a second machining station above the second transfer station and level with the first machining station. This apparatus further has according to the invention a second spindle having a second workpiece grab and only vertically displaceable on the frame between an upper position with the second grab in the second machining station and a lower position with the second grab in the second transfer station. The conveyor extends through both of the transfer stations, and a second deflector underneath the second machining station is shiftable between a side position out from underneath the grab and a use position extending between the second stations and blocking access to the second transfer station from above.

The deflector according to the invention can be a generally planar flap pivotal between the use and side positions. Alternately it is a tube through which the conveyor extends and formed with an aperture and the tube is rotatable about a central tube axis to open upward in the side position and downward in the use position.

BRIEF DESCRIPTION OF THE DRAWING

The above and other objects, features, and advantages will become more readily apparent from the following description, reference being made to the accompanying drawing in which.

FIG. is an operator-side view of a single-spindle machine according to the invention.

DETAILED DESCRIPTION

Figure 1:
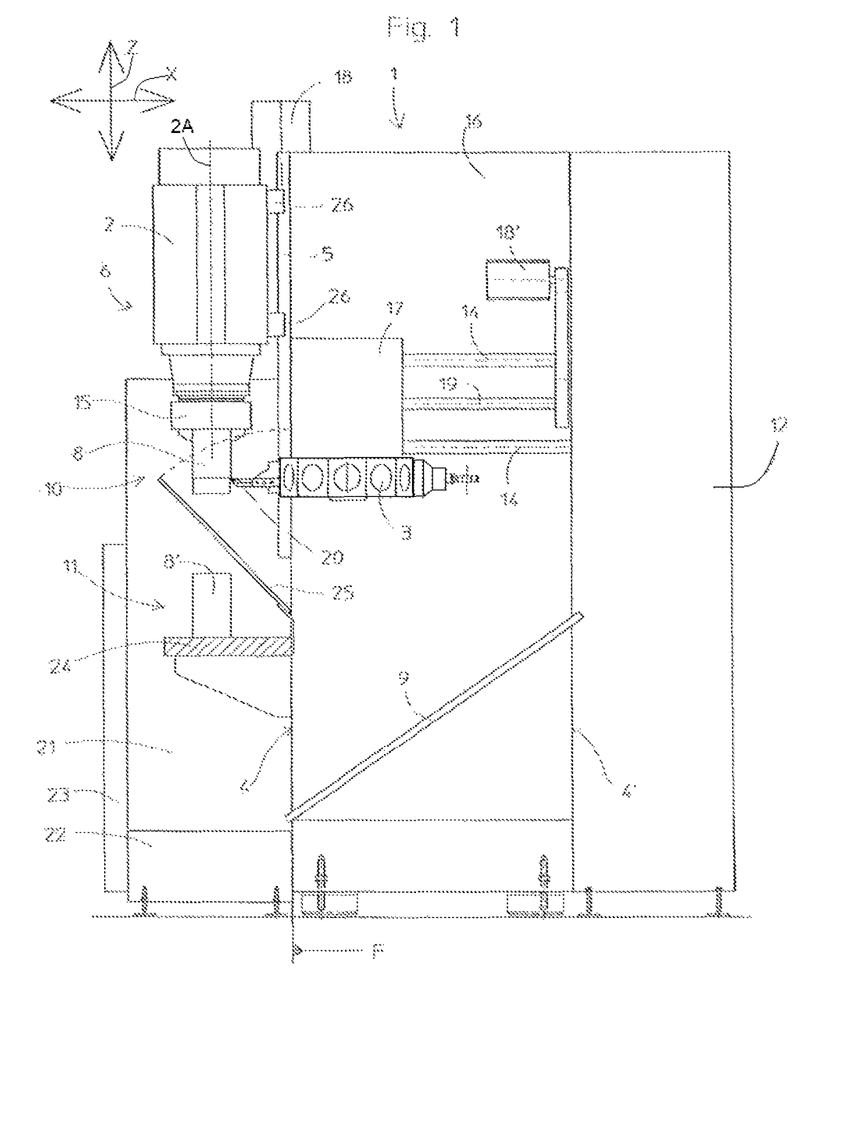

As seen in FIG. 1 a machining apparatus 1 has a basically parallelepipedal frame with side walls 4 and 4' and a front wall 16. The front wall 4 carries vertical guide rails 5 on which shoes 26 support a workpiece carriage 6 of a spindle 2 for vertical movement in a direction z. The spindle 2 carries a grab or chuck 15 that is rotatable about a vertical axis 2A of the spindle 2, and is displaceable between an upper machining station 10 and a lower transfer station by motor or actuator 18.

A tool carriage 17 can be shifted along guide rails 14 extending horizontally on the frame, parallel to a horizontal direction x and vertically level with the machining station 10. Another motor 18' is connected to a spindle 19 for horizontally shifting the carriage 17, which itself carries a support 3, here a turret, for a plurality of machining tools 20.

Underneath the spindle 2 is a schematically illustrated conveyor 24 that can transport unfinished workpieces 8 into the transfer station 11 and finished workpieces 8' away out of it, normally perpendicular to the directions x and z and to the plane of the view of FIG. 1.

A chip-deflecting shield 25 can prevent particles created in the machining station 10 from dropping down into the transfer station 11 and deflect them so they fall on a deflector panel 9 that guides them into a scrap bin 22 from which a conveyor 21 extends rearward to a scrap cart 23.

In FIG. 1 the shield 25 is a flat planar panel movable between the illustrated use position extending roughly at 45° to the vertical upward from a hinge at its lower edge and a vertical position lying against the front face 4. In the angled use position it intercepts any particles dropping from the working station and deflects them away from the transfer station and into the bin 22.

The machine described above operates as follows:

1. Assuming the grab 15 is not carrying a workpiece 8 or 8', that the station 11 is empty, the deflector 25 is in the vertical position, and that the carriage 6 is in the upper position shown in FIG. 1, the conveyor 24 first displaces an unmachined workpiece 8 into the station 11 into axial alignment below the spindle 2 and the entire carriage 6 is dropped by the motor 18 to fit the grab 15 to the workpiece 8.

2. The carriage 6 then, with the grab 15 locked to the workpiece 8, raises the workpiece high enough that the deflector 25 can be swung down into the angled use/deflecting position, then, if necessary, aligns the workpiece 8 with the tool holder 3. Thereafter the tool carriage 17 is moved in while, if necessary, the workpiece is rotated by the spindle 2 about the axis 2A, and the machining is done by the tool 2. All chips produced by the machining operation are deflected away from the conveyor and drop into the bin 22.

3. When the machining operation is completed, the deflector 25 is raised back up, after raising the finished workpiece 8' out of its way if necessary, and then the spindle 2 is dropped to set the finished workpiece 8' down on the conveyor, whereupon the grab 15 is released and the spindle 2 is raised again to move the grab 15 clear of the finished workpiece 8'.

4. The finished workpiece is then moved away and an unfinished workpiece 8 is moved into the station 10 to repeat the process.

Figure 1A:
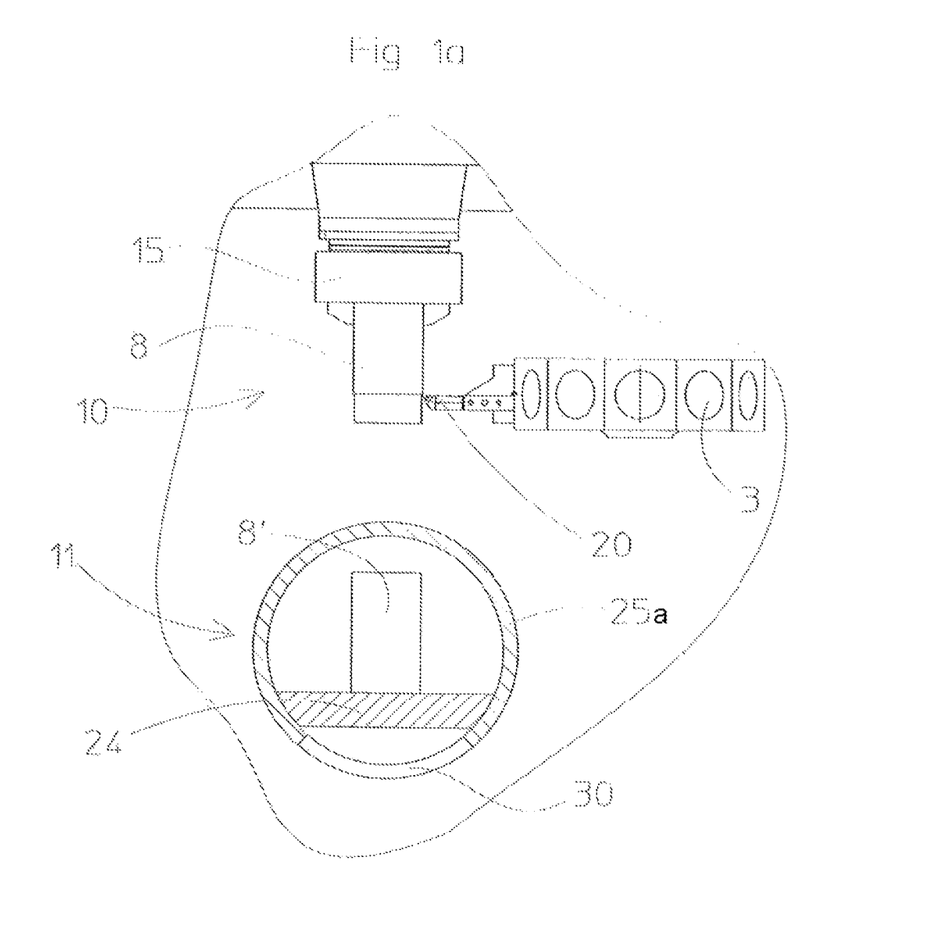
FIG. 1a is a large-scale view of a detail of a variant on the machine of FIG. 1.

FIG. 1a shows how instead of the deflector plate 25, a deflector tube 25a can be used that fits in the station 11 around the conveyor 24 and that has an aperture or slot 30. The tube 25' is rotatable about its horizontal central axis between the illustrated position with the aperture 30 open downward and the conveyor 24 and workpiece 8' protected from anything falling from above, and an unillustrated position with the aperture open upward and giving the grab 15 access to the workpiece 8' in the station 11.

Figure 2:
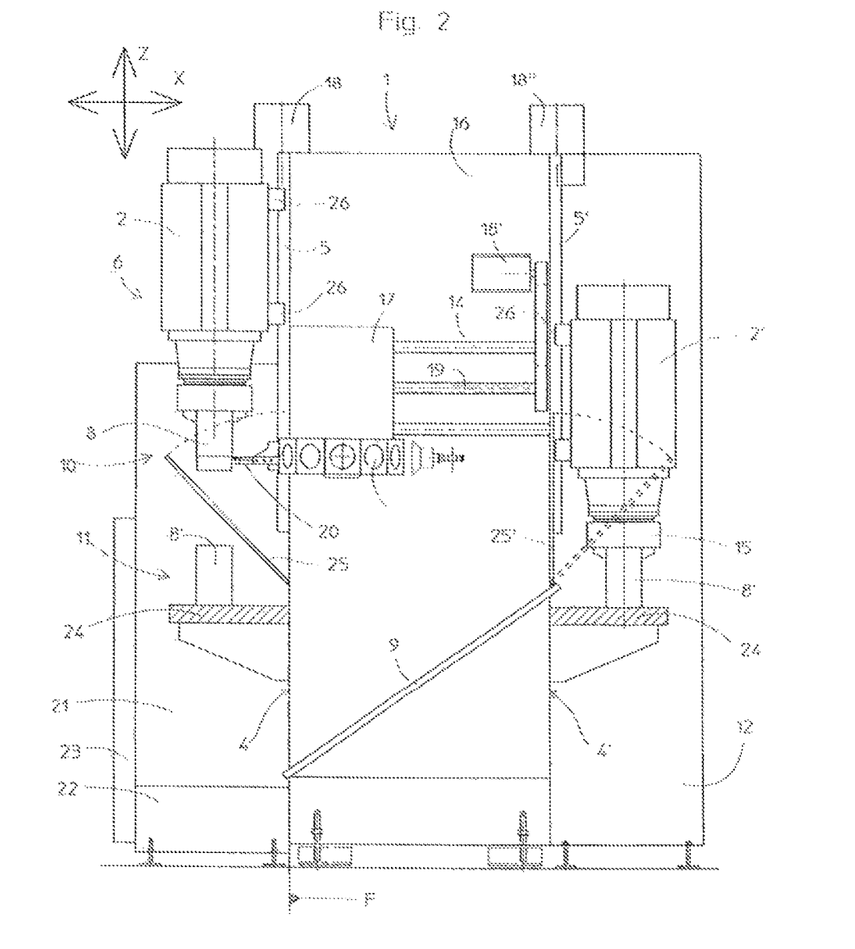
FIG. 2 is a two-spindle machine according to the invention.
Figure 3:
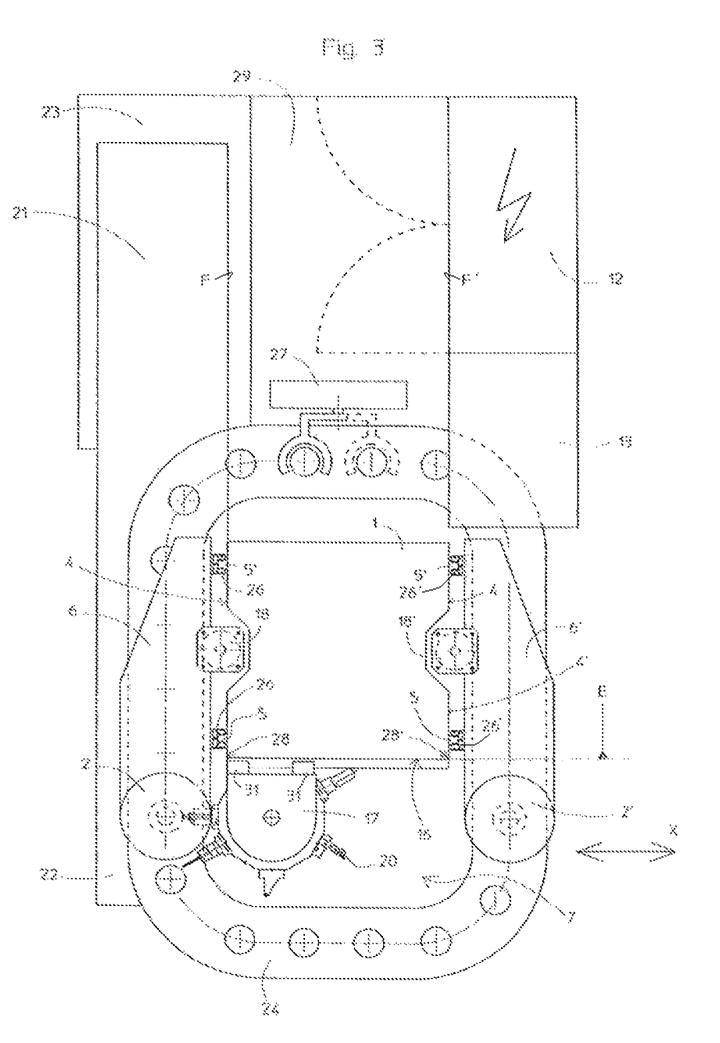
FIG. 3 is a top view of the FIG. 2 machine.

FIGS. 2 and 3 show a machine where parts with the same reference numerals as in FIG. 1, but followed by primes, are identical. Thus there are two machining stations 10 and 10', but the difference is that only a single tool support 3 on a tool carriage 17 can shuttle horizontally back and forth between them, so that only one set of tools is used. FIG. 3 also shows how the tool carriage 17 rides via four shoes 31 on the guide rails 14.

With this machine as a workpiece is being moved into or taken out of one of the machining stations 10 or 10', the tools 20 are at work in the other station 10 or 10', and similarly the transfer stations 11 and 11' can be alternately loaded and unloaded, so that the machine is in substantially continuous use with only one set of tools 20.

In FIGS. 2 and 3 also shows that the conveyor 24 is annular, that is forms a closed loop. A device 27 for turning the workpieces over is provided so that they can be gripped at one end and finished the other end in the station 11 on the one side wall 4 and then gripped on the other end and finished on the one end in the station 11' on the other side wall 4'.

FIG. 3 furthermore shows that the spindles 2 and 2' are cantilevered forward from the respective carriages 6 and 6' into a space 7 in front of the front wall 16, the same space 7 in which the tool carriage 17 travels back and forth, so that critical parts of this machine are readily accessible for maintenance and servicing. This space lies forward of a vertical plane E of the front wall 16, and the side walls 4 and 4' lie in vertical planes that are perpendicular to the plane E and meet at corners 28 of the machine frame.

Since one of the vertical guide rails 5 and one of the vertical guides 5' are close to the corners 28 and 28' and the horizontal guide rails 14 extend the entire width of the front wall and to the corners, the machine frame is very rigid.

A control cabinet 12, which can be opened toward the inside, is located behind the machine outward of the plane F', opening into a space 29. The chip conveyor 21 extends rearward to the cart 23 that lies on the other side of the space 29 mainly outward of the plane F.

Figure 4:
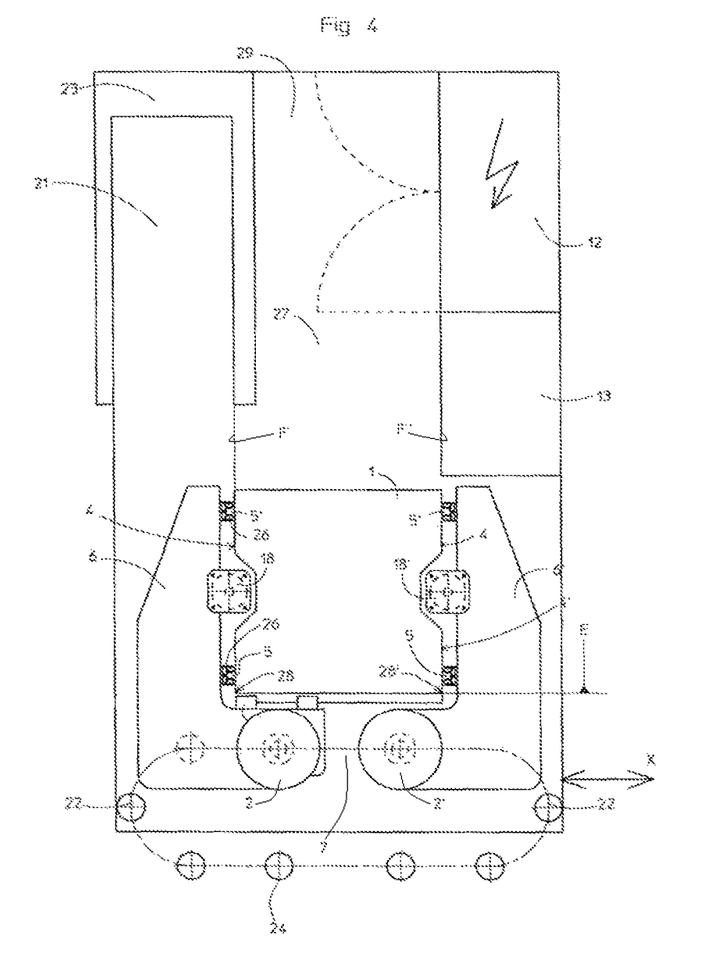
FIG. 4 is a top view of a two-spindle machine for small workpieces.
Figure 5:
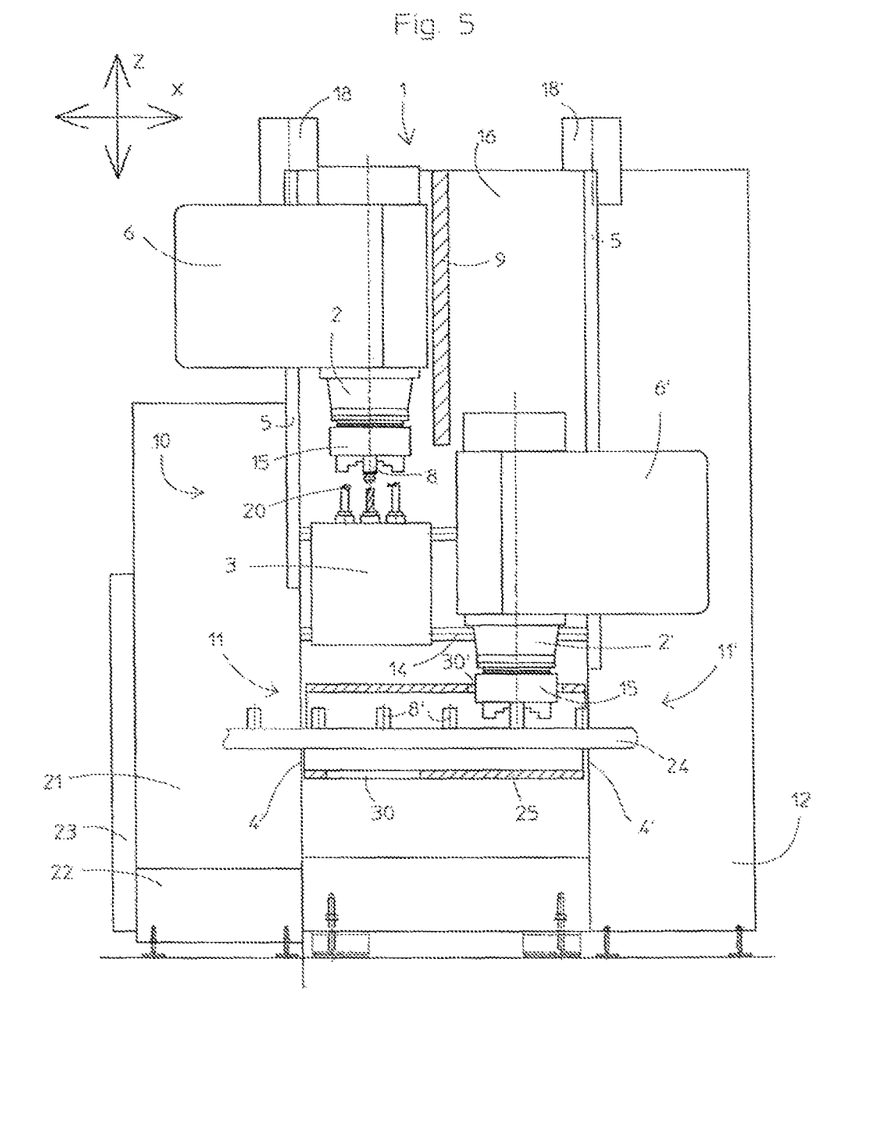
FIG. 5 is a side view of the machine of FIG. 4.

An advantageous design for finishing small workpieces is shown in FIGS. 4 and 5. Because in the case of small workpieces, the advancing and feed paths are correspondingly short, the two carriages 6 and 6' are L-shaped so the respective spindles 2 and 2' can be directly adjacent to each other in the front space 7 and between the planes F and F' to thus shorten the distance traveled by tool holder 3. As the workpiece finishing is limited to a few operating steps, a tool holder 3 that holds three tools 20 and that can be displaced horizontally on the guides 14. Both reaches of the endless conveyor 24 extend parallel to the front side 16 underneath the workpiece spindles 2 and 2' and through transfer stations 11 and 11'. The chip deflector 25 is tubular with openings 30 and 30' as shown in FIG. 1A. The openings 30 and 30' are on diametrically opposed sides of the tube so that the transfer stations 11 and 11' associated with workpiece spindles 2 and 2' are alternatively protected from chips or are accessible in the open position for changing workpieces 8 and 8'.

We claim:

1. A method of operating a machining apparatus having:
   a frame defining a first transfer station and a first machining station thereabove;
   a first spindle having a workpiece grab and vertically displaceable on the frame between an upper position with the grab in the machining station and a lower position with the grab in the transfer station;
   a tool holder horizontally displaceable on the frame toward and away from the machining station; and
   a workpiece conveyor extending through the transfer station,
   the method comprising the steps of sequentially:
   a) after shifting a deflector underneath the machining station into a side position out from underneath the grab, lowering the grab, picking an at least partially unmachined workpiece in the transfer station off the conveyor with the grab, and raising the grab and workpiece into the machining station;
   b) shifting the deflector into a use position over the transfer station and under the machining station;
   c) engaging a tool held in the tool holder with the workpiece in the machining station and machining the workpiece such that chips fall from the workpiece while maintaining the deflector in the use position and deflecting the falling chips with the deflector away from the transfer station;
   d) stopping machining of the workpiece, shifting the deflector into the side position, and lowering the grab with the machined workpiece onto the conveyor in the transfer station; and
   e) transporting the machined workpiece out of the transfer station and transporting a fresh at least partially unmachined workpiece into the transfer station.

2. The method defined in claim 1, wherein the frame defines a second machining station and a second transfer station respectively level with the first machining station and the first transfer station, the method further comprising the steps of:
   shifting the tool holder alternately between the machining stations to machine workpieces therein;
   moving a workpiece into and out of one of the stations while machining in the other and vice versa; and
   alternately transporting unmachined workpieces into and out of the transfer stations.

3. The method defined in claim 2, wherein the conveyor passes between the transfer stations, the method further comprising the step of:
   inverting workpieces as they pass from one of the transfer stations to the other, whereby both ends or sides of the workpiece can be machined by the machine.

4. The method defined in claim 1, further comprising the step of:
   rotating the workpiece about a vertical axis while pressing the tool radially against the workpiece to machine the workpiece in step c).

5. An apparatus for machining workpieces, the apparatus comprising:
   a frame defining a first transfer station and a first machining station thereabove;
   a first spindle having a workpiece grab and only vertically displaceable on the frame between an upper position with the grab in the machining station and a lower position with the grab in the transfer station;
   a tool holder horizontally displaceable on the frame toward and away from the machining station;
   a workpiece conveyor extending through the transfer station;
   a deflector underneath the machining station and shiftable between a side position out from underneath the grab and a use position extending between the stations and blocking access to the transfer station from above;
   drive means for, with the deflector in the side position, lowering the grab, picking an at least partially unmachined workpiece in the transfer station off the conveyor with the grab, and raising the grab and workpiece into the machining station;
   means for shifting the deflector into a use position over the transfer station and under the machining station when the grab is in the upper position; and
   drive means for engaging a tool held in the tool holder with the workpiece in the machining station and machining the workpiece such that chips fall from the workpiece while maintaining the deflector in the use position and deflecting the falling chips with the deflector away from the transfer station.

6. The machining apparatus defined in claim 5 wherein the frame has a first side wall extending in a first side plane and carrying a vertical guide on which the spindle is vertically shiftable and a front wall extending in a front plane meeting the first side plane at a first corner of the frame and carrying a horizontal guide on which the holder is shiftable, the stations being at the first corner.

7. The machining apparatus defined in claim 6 wherein the vertical guide includes a vertical guide rail at the first corner and the horizontal guide extends to the first corner.

8. The machining apparatus defined in claim 7 wherein the tool holder is only shiftable horizontally.

9. The machining apparatus defined in claim 8 wherein the frame has a second side wall extending in a second plane and meeting the front plane at a second corner and the frame defines a second transfer station at the second corner and a second machining station above the second transfer station and level with the first machining station, the apparatus further comprising:

a second spindle having a second workpiece grab and only vertically displaceable on the frame between an upper position with the second grab in the second machining station and a lower position with the second grab in the second transfer station, the conveyor extending through both of the transfer stations;

a second deflector underneath the second machining station and shiftable between a side position out from underneath the grab and a use position extending between the second stations and blocking access to the second transfer station from above.

10. The machining apparatus defined in claim 5 wherein the deflector is a generally planar flap pivotal between the use and side positions.

11. The machining apparatus defined in claim 5 wherein the deflector is a tube through which the conveyor extends and formed with an aperture and the tube is rotatable about a central tube axis to open upward in the side position and downward in the use position.

\* \* \* \* \*